(12) United States Patent
Tao et al.

(10) Patent No.: US 10,250,508 B2
(45) Date of Patent: Apr. 2, 2019

(54) LOAD BALANCING METHOD AND SYSTEM

(71) Applicant: ZTE CORPORATION, Shenzhen, Guangdong Province (CN)

(72) Inventors: Quanjun Tao, Shenzhen (CN); Tian Tian, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 323 days.

(21) Appl. No.: 15/113,443

(22) PCT Filed: Jul. 25, 2014

(86) PCT No.: PCT/CN2014/083087
§ 371 (c)(1),
(2) Date: Jul. 22, 2016

(87) PCT Pub. No.: WO2015/109803
PCT Pub. Date: Jul. 30, 2015

(65) Prior Publication Data
US 2017/0005935 A1    Jan. 5, 2017

(30) Foreign Application Priority Data
Jan. 23, 2014 (CN) .......................... 2014 1 0033741

(51) Int. Cl.
*H04L 12/64* (2006.01)
*H04L 12/803* (2013.01)
(Continued)

(52) U.S. Cl.
CPC ........ *H04L 47/125* (2013.01); *H04L 12/6418* (2013.01); *H04L 47/00* (2013.01); *H04L 47/822* (2013.01); *H04L 67/1002* (2013.01); *H04L 67/1008* (2013.01); *H04L 67/1023* (2013.01); *H04L 45/745* (2013.01)

(58) Field of Classification Search
CPC ... H04L 12/6418; H04L 45/745; H04L 47/00; H04L 47/125; H04L 47/822; H04L 67/1002; H04L 67/1008; H04L 67/1023
See application file for complete search history.

(56) References Cited

U.S. PATENT DOCUMENTS

| | | | |
|---|---|---|---|
| 6,725,253 B1 * | 4/2004 | Okano | H04L 29/12009 370/237 |
| 8,028,086 B2 * | 9/2011 | Naseh | H04L 29/12367 709/238 |

(Continued)

FOREIGN PATENT DOCUMENTS

| CN | 1738291 A | 2/2006 |
|---|---|---|
| CN | 101447929 A | 6/2009 |

(Continued)

*Primary Examiner* — Christopher Biagini
(74) *Attorney, Agent, or Firm* — Ling Wu; Stephen Yang; Ling and Yang Intellectual Property (57) ABSTRACT

A load balancing method and system are provided in the embodiments of the present document. The method includes: collecting load information of a load balancing object, and generating a load balancing group table according to the load information; generating a load balancing group routing table according to information of the load balancing group table; and forwarding a data packet according to the load balancing group routing table.

13 Claims, 9 Drawing Sheets

(51) Int. Cl.
*H04L 12/70* (2013.01)
*H04L 12/911* (2013.01)
*H04L 29/08* (2006.01)
*H04L 12/741* (2013.01)

(56) References Cited

U.S. PATENT DOCUMENTS

| | | | | |
|---|---|---|---|---|
| 2006/0212597 A1* | 9/2006 | Shimada | ............ | H04L 67/1008 |
| | | | | 709/238 |
| 2014/0173018 A1* | 6/2014 | Westphal | ............ | H04L 41/0823 |
| | | | | 709/213 |
| 2014/0310418 A1* | 10/2014 | Sorenson, III | ...... | H04L 67/1002 |
| | | | | 709/226 |
| 2015/0117216 A1* | 4/2015 | Anand | ................. | H04L 47/125 |
| | | | | 370/236 |
| 2015/0142958 A1* | 5/2015 | Tamura | ............... | H04L 67/1008 |
| | | | | 709/224 |
| 2015/0189009 A1* | 7/2015 | van Bemmel | ...... | H04L 67/1008 |
| | | | | 709/226 |

FOREIGN PATENT DOCUMENTS

| | | |
|---|---|---|
| CN | 101478484 A | 7/2009 |
| CN | 102970242 A | 3/2013 |

\* cited by examiner

LOAD BALANCING METHOD AND SYSTEM

TECHNICAL FIELD

The present document relates to the field of communication, and particularly, to a virtualization load balancing control method for the communication network elements.

BACKGROUND OF THE RELATED ART

A large number of various dedicated hardware devices that are still intensively increasing exist in the networks of the telecom operators, it is always required to add more new dedicated hardware devices when a new network service is launched, and the space for placing the devices and supplying power for the devices become more and more difficult, and the accompanying difficulties also include the aggravated rise of energy costs, the challenge of capital investments and lack of essential design skills, and hardware devices with increasingly complicated integration and operation. In addition, the life cycle of the hardware devices is very short, and such that a large amount of purchasing-design-integration-deployment is required to perform, which is almost worthless repetition to incoming. Worse still, the life cycle of the hardware begins to get short, but the innovation speed of the services is accelerating, which restrains obtaining additional income from the network service innovation, and constraints the innovation of the increasingly networked connective world.

The object of the Network Function Virtualization (NFV) is to solve the above problem by unifying many network device types into the industrial standard high-capacity servers, switches and storages which may be placed in a data center, a network node and a terminal, with the Information Technology (IT) standardized virtualization technology.

Figure 1:
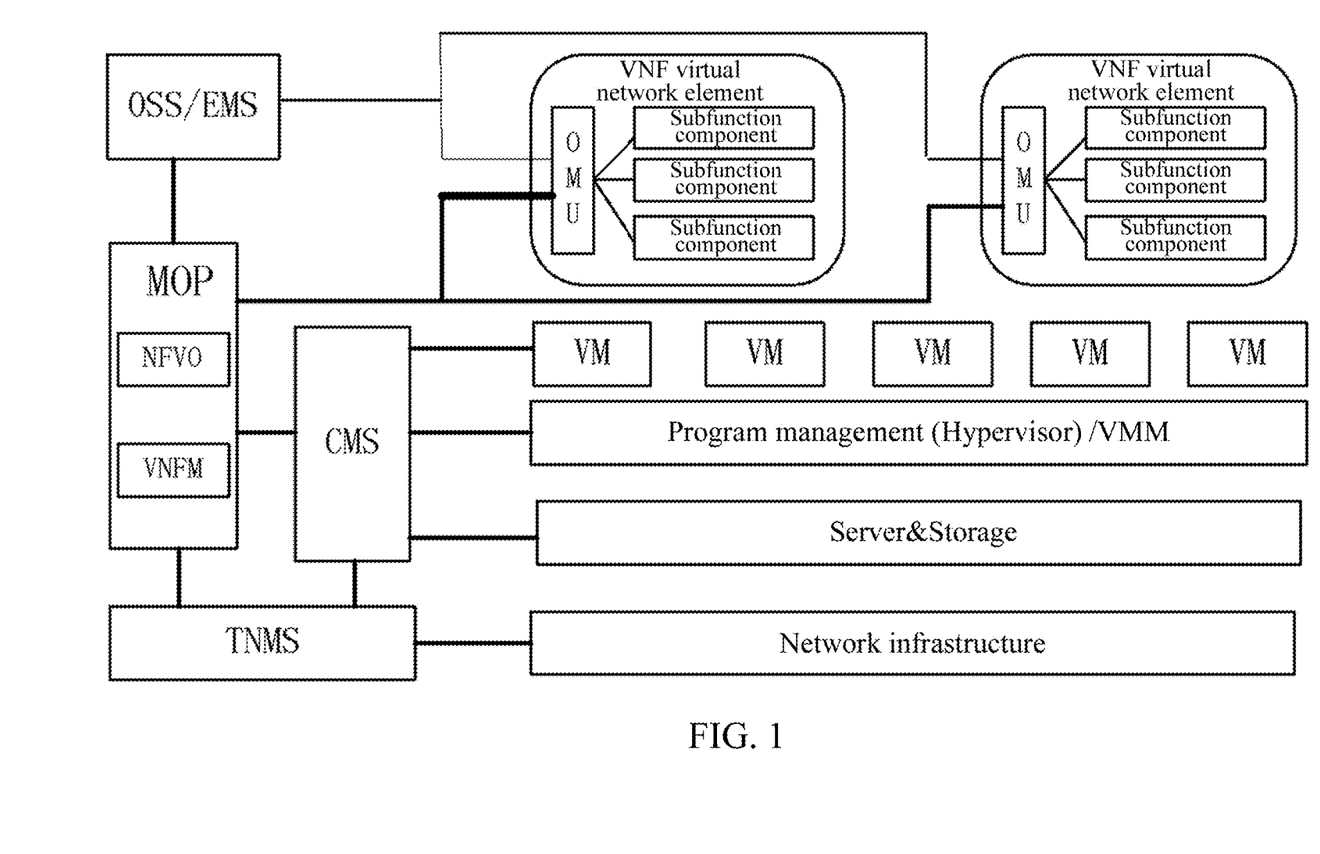
FIG. 1 is a schematic diagram of the network virtualization architecture in the related art.

FIG. 1 is a schematic diagram of a network virtualization architecture approved by the majority of researchers and research institutions in the related art, wherein:

a network Management & Orchestration Platform (MOP) takes charges of establishing and managing a network virtualization operating environment, which includes coordinating and managing a Network Function Virtualization Infrastructure (NFVI) domain and a Network Function Virtualization Service (NVFS) domain; and the MOP includes a Network Function Virtualization Orchestration (NFVO) and a Virtual Network Function Management (VNFM), wherein the NFVO is mainly responsible for the service orchestration of the whole network and the network resource management, and the VNFM is mainly responsible for the Virtual Network Function (VNF) resource management;

a main function of a Cloud Management System (CMS) is to implement the cloud management and monitoring;

a main function of a Transport Network Management System (TNMS) is to manage and monitor a transport IP layer network;

a main function of the Hypervisor (program management)/Virtual Machine Management (VMM) is to implement the virtualization capability and virtualize the hardware resources to a plurality of Virtual Machines (VM);

the Operate Support System (OSS)/Element Management System (EMS) is an operator element management background, and takes charges of managing and monitoring the virtual network element service logic; and a Virtual Network Function (VNF) loads corresponding network element software versions by a virtual machine, and virtualizes physical network elements in the operator networks.

Wherein, an Operator Management Unit (OMU) is a network element operation and maintenance management unit, and in a virtualization deployment scenario, the OMU is required to add an interface with the network management system/OSS, so as to implement the monitoring and management on the virtual machine of the belonged virtual network element;

a Virtual Network Sub Function (VNSF) component is a software subfunction module of the virtual network element, one network element may be disassemble into a plurality of subfunction components, each function component completes one function, and the components of the same type may be required to map into one or more VMs according to the processing capability;

a server, a storage device and a transport network device are the network virtualization infrastructure, which mainly provides a hardware resource pool for the network virtualization.

Figure 2:
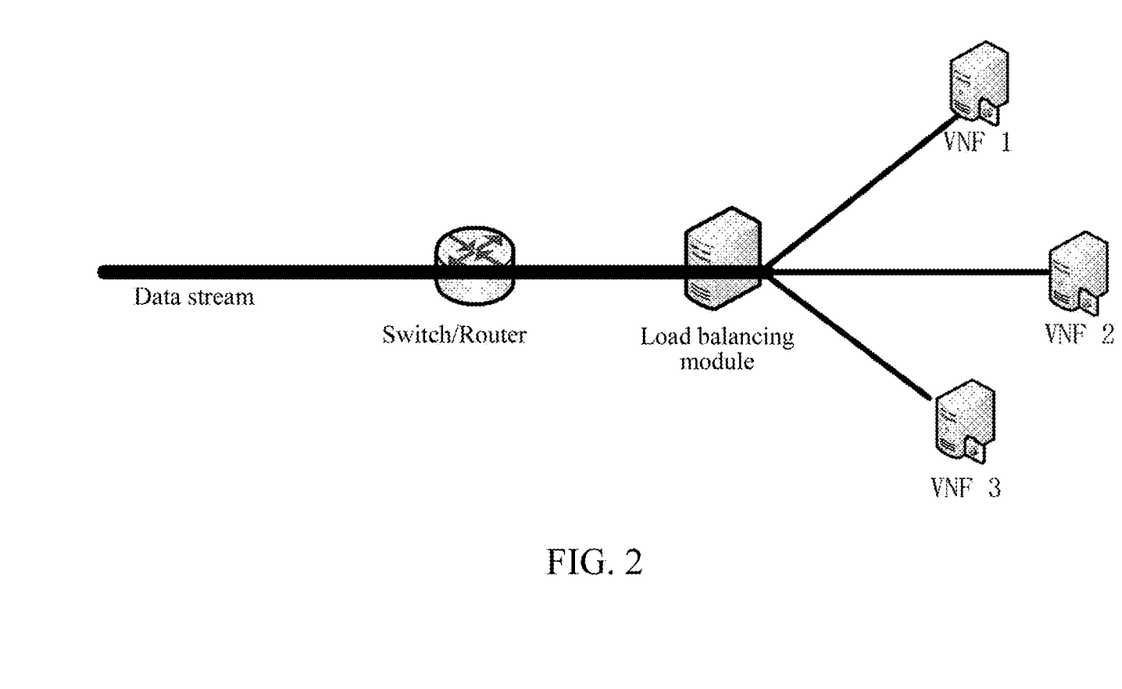
FIG. 2 is diagram of the basic architecture of a load balancing system in the related art.

In the network element virtualization scenario, in order to improve the performance and reliability of the VNF, generally it is required to use the concurrent processing mode of a plurality of VNFs or a plurality of VNFCs within the VNF, the Load Balance (LB) is the key to solve the problem, and the basic architecture of the LB mechanism in the related art is as shown in FIG. 2.

In the architecture of the related art, traffics are basically aggregated to the LB firstly, the LB performs a traffic allocation according to a load balancing policy, and in the future clouded network model, the VNF may be expanded infinitely, and as a result, the LB will become a bottleneck of the network. Especially when a forwarding plane device of the 4G mobile network is also virtualized at the later period, the forwarding plane data are also required to pass through the LB. Certainly, the LB may use a layered mode, but the complexity of the network topology will be increased on one hand, and the network investment cost will also be increased on the other hand.

SUMMARY

The technical problem required to be solved in the embodiments of the present document is to provide a load balancing method and system, to reduce the load of the load balancing.

A load balancing method comprises:

collecting load information of a load balancing object, and generating a load balancing group table according to the load information;

generating a load balancing group routing table according to information of the load balancing group table; and forwarding a data packet according to the load balancing group routing table.

Preferably, the above method may further have the following feature: the load information at least comprises:

processing capability information or load weight information of load balancing group branch objects;

the number of the load balancing group branch objects;

address information of the load balancing group branch objects;

the number of the load balancing groups; and group identification information of the load balancing groups.

Preferably, the above method may further have the following feature: collecting load information of a load balancing object comprises:

in a layered organization architecture model, respectively collecting load information of each load balancing group;

then summarizing load information of all load balancing groups, and determining load weight information of each load balancing group.

Preferably, the above method may further have the following feature: collecting load information of a load balancing object comprises:

in a virtual network function architecture model, collecting load information between virtual network elements set by a network function virtualization orchestration; and collecting load information between various virtual machines within virtual network elements set by a virtual network element management.

Preferably, the above method may further have the following feature: information in the load balancing group routing table at least comprises:

a group identifier, group identification information, sub-branch object load weight information, and a subgroup object switch egress port.

Preferably, the above method may further have the following feature:

the branch object load weight information is represented by a bearing space value, branch objects in the load balancing group routing table are arranged according to an order of bearing space values from small to large, and a load proportion corresponding to the branch object is equal to a bearing space value corresponding to the branch object minus a bearing space value corresponding to a previous branch object and then divided by a maximum branch bearing space value in the group.

Preferably, the above method may further have the following feature:

forwarding a data packet according to the load balancing group routing table comprises:

acquiring a user identifier of the data packet;

determining a bearing space value to which the data packet belongs according to the user identifier; and selecting a corresponding group sub-branch object from the load balancing group routing table according to the bearing space value to forward the data packet.

Preferably, the above method may further have the following feature: determining a bearing space value to which the data packet belongs according to the user identifier comprises:

performing Hash operation on the user identifier, at a specified location taking a Hash value which has a same number of bits with a number of bits of the bearing space value, and comparing the Hash value with each bearing space value in the corresponding group, when the Hash value is less than a bearing space value of an ith branch object and greater than a bearing space value of an (i−1)th branch object, determining that the bearing space value to which the data packet belongs is the bearing space value of the ith branch object, wherein i is a positive integer, and when i=1, a bearing space value of a 0th branch object is 0.

A load balancing system comprises a load balancing module, a network controller and a network switch module, wherein, the load balancing module is configured to collect load information of a load balancing object, and generate a load balancing group table according to the load information;

the network controller is configured to generate a load balancing group routing table according to information of the load balancing group table, and send the load balancing group routing table to the switch module; and the network switch module is configured to forward a data packet according to the load balancing group routing table.

Preferably, the above system may further have the following feature: the load information collected by the load balancing module at least comprises:

processing capability information or load weight information of load balancing group branch objects;

a number of the load balancing group branch objects;

address information of the load balancing group branch objects;

a number of load balancing groups; and/or group identification information of the load balancing group.

Preferably, the above system may further be characterized in that: in a layered organization architecture model, the load balancing module comprises a plurality of first load balancing modules and a second load balancing module, wherein, the first load balancing modules are respectively configured to collect load information of each load balancing group, and report collected load information to the second load balancing module;

the second load balancing module is configured to summarize load information of all load balancing groups, and determine load weight information of each load balancing group.

Preferably, the above system may further have the following feature: in a virtual network function architecture model, the load balancing module comprises:

a first load balancing module, configured to collect load information between virtual network elements set by a network function virtualization orchestration; and a second load balancing module, configured to collect load information between various virtual machines within virtual network elements set by a virtual network element management.

Preferably, the above system may further have the following feature: information in the load balancing group routing table generated by the control module at least comprises:

a group identifier, group identification information, sub-branch object load weight information, and a subgroup object switch egress port, wherein, the branch object load weight information is represented by a bearing space value, branch objects in the load balancing group routing table are arranged according to an order of bearing space values from small to large, and a load proportion corresponding to the branch object is equal to a bearing space value corresponding to the branch object minus a bearing space value corresponding to a previous branch object and then divided by a maximum branch bearing space value in the group.

Preferably, the above system may further have the following feature:

the network switch module is configured to acquire a user identifier of the data packet; determine a bearing space value to which the data packet belongs according to the user identifier; and select a corresponding group sub-branch object from the load balancing group routing table according to the bearing space value to forward the data packet.

Preferably, the above system may further have the following feature:

the network switch module is configured to determine a bearing space value to which the data packet belongs according to the user identifier as the following method: performing Hash operation on the user identifier, at a specified location taking a Hash value which has a same number of bits with a number of bits of the bearing space value, and comparing the Hash value with each bearing space value in the corresponding group, when the Hash value is less than a bearing space value of an ith branch object and greater than a bearing space value of an (i−1)th branch object, determining that the bearing space value to which the data packet belongs is the bearing space value of the ith branch object, wherein i is a positive integer, and when i=1, a bearing space value of a 0th branch object is 0.

The embodiment of the present document further provides a computer program, which comprises a program instruction, wherein, when the program instruction is executed by a load balancing system, the load balancing system can execute the above method.

The embodiment of the present document further provides a carrier carrying the above computer program.

In conclusion, in a load balancing method and system provided in the embodiments of the present document, a concept of separating forwarding and control is introduced, the data flows are bypassed the LB, and the LB is responsible for collecting performance data of the VNF, and dynamically changes the data flow weight in the switch through a northbound interface of the network controller, which reduces the load of the LB, and avoids that the LB becomes a bottleneck of the network.

PREFERRED EMBODIMENTS

The embodiments of the present document will be described in detail in combination with the accompanying drawings below. It should be noted that the embodiments in the present document and the characteristics in the embodiments can be arbitrarily combined with each other in the case of no conflict.

Figure 3:
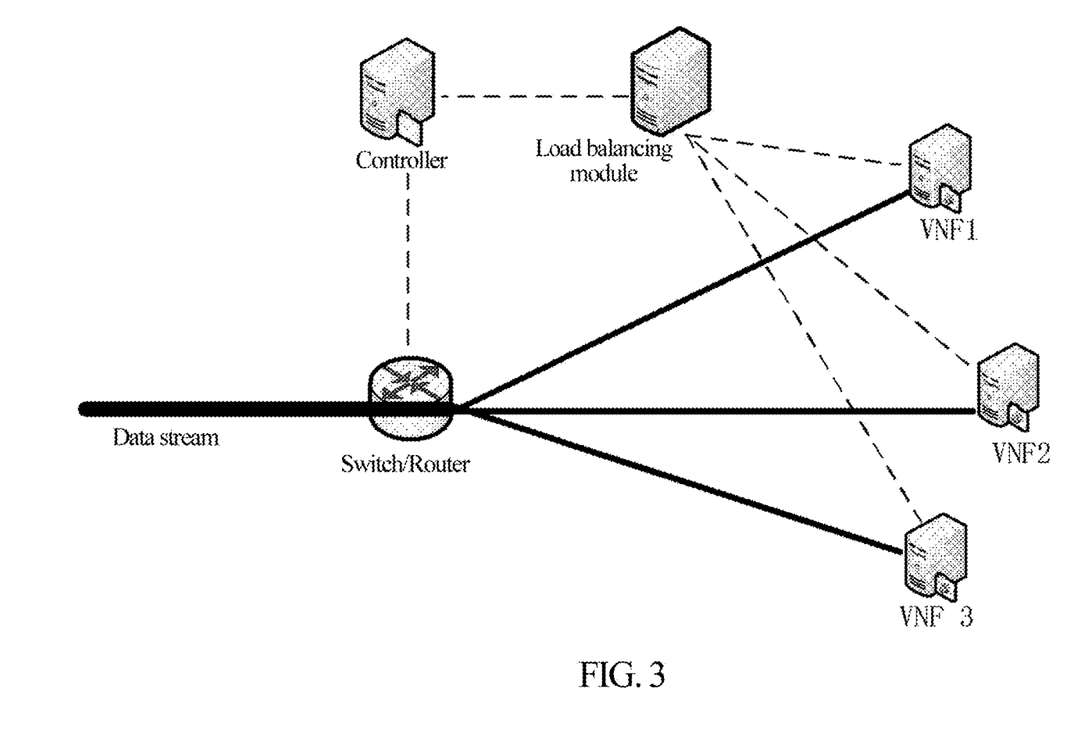
FIG. 3 is a schematic diagram of the basic architecture of a load balancing system in the embodiment of the present document.

FIG. 3 is a schematic diagram of the basic architecture of the load balancing system in the embodiment of the present document, and compared with the related art in FIG. 2, a concept of separating forwarding and control is used in the embodiment of the present document, so that data flows are bypassed a load balancing module LB, and a network Controller is introduced, to reduce the load.

Figure 4:
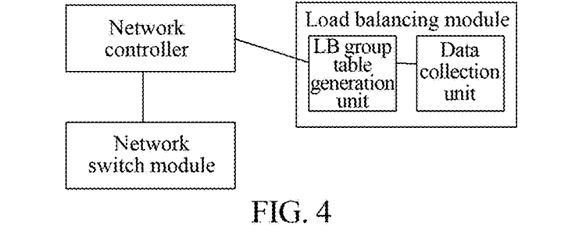
FIG. 4 is a schematic diagram of a load balancing system in the embodiment of the present document.

FIG. 4 is a schematic diagram of a load balancing system in the embodiment of the present document, and as shown in FIG. 4, the load balancing system of the embodiment includes: a load balancing module, a network controller and a network switch module. Wherein, the load balancing module includes a data collection unit, a load balancing group table generation unit and a load balancing group table modification unit, wherein, the data collection unit is configured to collect load information of a load balancing object; and the load balancing group table generation unit is configured to generate a load balancing group table according to the load information, and the load balancing group table includes address information, load weight information and group identification information of the load balancing object.

The network controller is configured to generate a load balancing group routing table according to information of the received load balancing group table, and send the load balancing group routing table to the switch module; and the network switch module is configured to forward a data packet according to the load balancing group routing table.

Wherein, the load information collected by the collection unit includes but is not limited to:

maximum and minimum processing capability information of the load balancing group branch objects;

a number of the load balancing group branch objects;

address information of the load balancing group branch objects;

a number of the load balancing groups; and/or identification information of the load balancing groups.

Wherein, the information of the load balancing group routing table includes: a group identifier, group identification information, and/or group execution information, the group execution information may include: a target address of the group sub-branch object, sub-branch object load weight information, a sub-branch object load balancing policy, and/or a subgroup object switch egress port.

Figure 5:
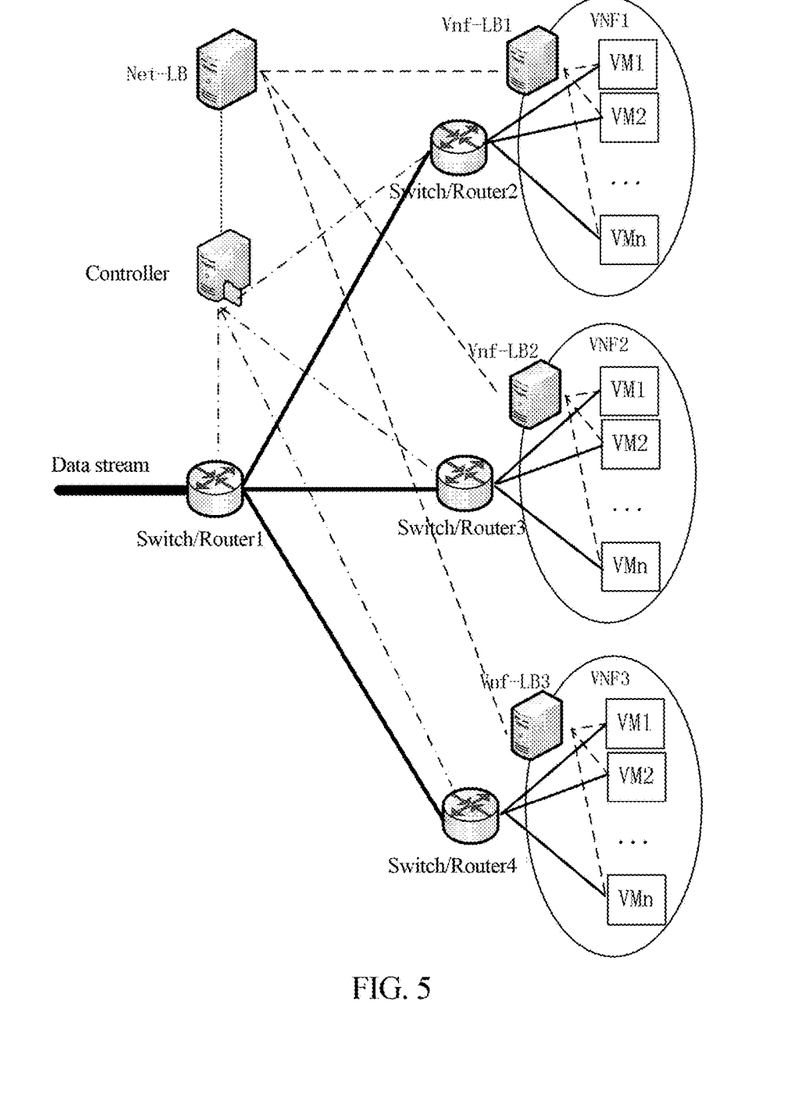
FIG. 5 is a schematic diagram of a layered architecture model in the embodiment of the present document.

In one preferred embodiment, in a layered organization architecture model, the load balancing module may include a plurality of first load balancing modules and a second load balancing module, wherein, the first load balancing modules are respectively configured to collect load information of each load balancing group, and report collected load information to the second load balancing module; and the second load balancing module is configured to summarize load information of all load balancing groups, and determine load weight information of each load balancing group.

FIG. 5 is a schematic diagram of the layered architecture model in the embodiment of the present document, as shown in FIG. 5, the load balancing module is divided into two layers, one layer is a network layer load balancing module (Net-LB), and one layer is a network element layer load balancing module (Vnf-LB). Wherein, the Net-LB is mainly responsible for performing load balancing operation on virtual network elements, and the Vnf-LB is responsible for load balancing operation on virtual machines VMs within the virtual network elements. The Vnf-LB takes charges of collecting the load information of the virtual machines within the VNF, and the Net-LB takes charges of collecting the overall load information of the VNF (such as the average load of the virtual machines within the VNF). In the layered architecture model, the balancing modules of two layers performing data collection has the following advantages: the Vnf-LB may reduce the load sharing of the Net-LB; the Vnf-LB may shield the network topology of the virtual machines within the VNF; and the load adjustment of the virtual machines within a single VNF would not affect other Vnf-LBs.

Figure 6:
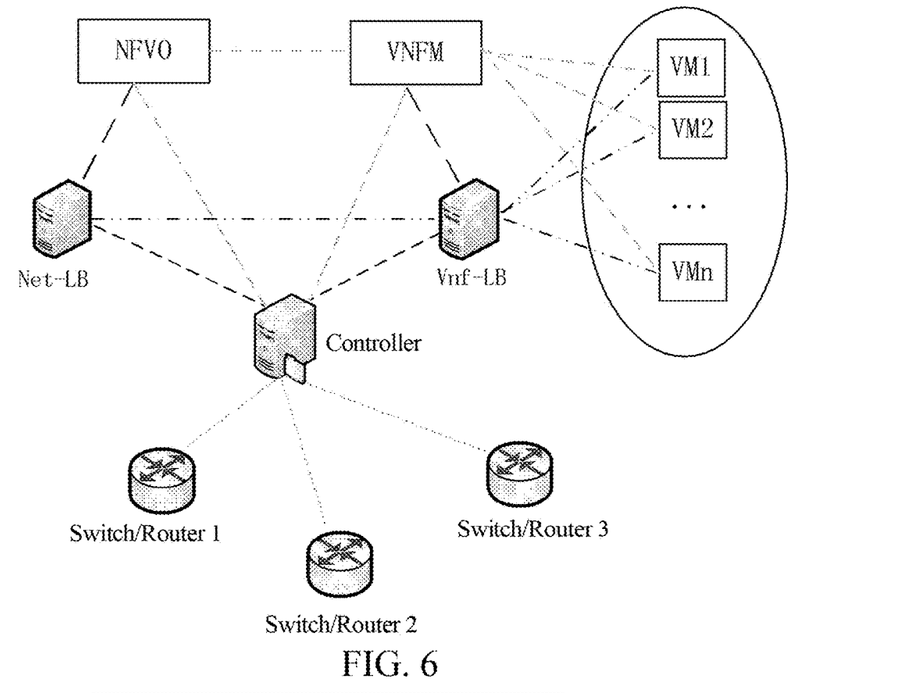
FIG. 6 is a schematic diagram of a network virtualization architecture model in the embodiment of the present document.

In another preferred embodiment, in a virtual network function architecture model, the load balancing module includes: a first load balancing module, configured to receive load information of load balancing between virtual network elements set by a network function virtualization Orchestration, wherein the load information at least includes: the number of network groups, the number of virtualization network element functions included in each group, and the capability information or load weight information of each virtual network element; a second load balancing module, configured to receive load information of load balancing between various virtual machines within virtual network elements set by a virtual network element function management, wherein the load information at least includes: the number of groups in the virtual network element functions, the number of virtual machines included in each group, and the capability information or load weight information of each virtual machine.

FIG. 6 is a schematic diagram of the network virtualization architecture model in the embodiment of the present document, and as shown in FIG. 6, the Net-LB is connected with the Network Function Virtualization Orchestration (NFVO), the Vnf-LB is connected with the Virtual Network Function Management (VNFM), the NFVO is responsible for setting load balancing between the VNFs for the Net-LB, and the VNFM takes charge of setting load balancing between the virtual machines within the VNF for the Vnf-LB.

Figure 7:
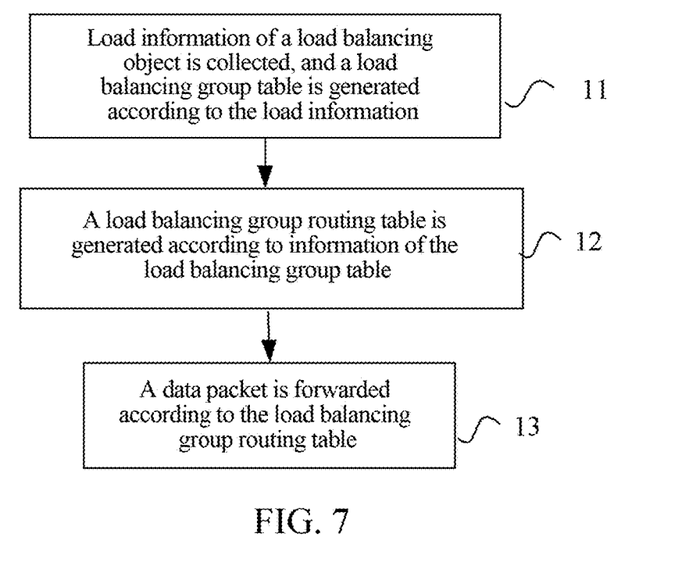
FIG. 7 is a flow chart of a load balancing method in the embodiment of the present document.

FIG. 7 is a flow chart of a load balancing method in the embodiment of the present document, and as shown in FIG. 7, the method of the embodiment includes:

In step 11, load information of a load balancing object is collected, and a load balancing group table is generated according to the load information;

In step 12, a load balancing group routing table is generated according to information of the load balancing group table;

In step 13, a data packet is forwarded according to the load balancing group routing table.

The embodiment of the present document also provides a computer program, which includes a program instruction, wherein, when the program instruction is executed by a load balancing system, the load balancing system can execute the above method.

The embodiment of the present document also provides a carrier carrying the above computer program.

Figure 8:
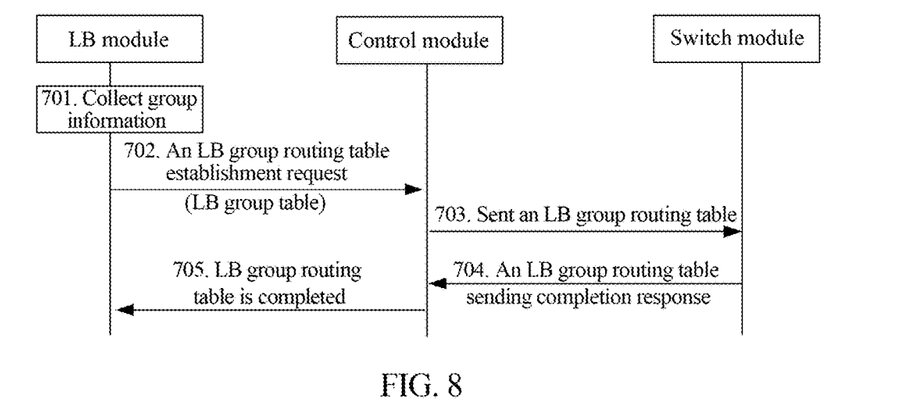
FIG. 8 is a flow chart of establishing a load balancing group routing table corresponding to the architecture model in FIG. 3 in the embodiment of the present document.

FIG. 8 is a flow chart of establishing a load balancing group routing table corresponding to the architecture model in FIG. 3, and as shown in FIG. 8, the following steps are included:

In step 701, a load balancing module (LB) collects load information, and the load information may include:
1) the maximum and minimum number of examples supported by the virtual network element VNFs required to be balanced (the supported maximum and minimum number of examples is a reflection of the processing capability);
2) the number of VNFs of the same kind;
3) the number of groups of the VNFs required to be balanced;
4) address information, such as an IP address and an MAC address and so on, of the VNFs required to be balanced; and
5) group identification information, mainly used for the switch module judging an LB group to which the data packet belongs according to the group identification information after receiving the data packet, wherein the group identification information may be set as a target IP address field or a target Media Access Control (MAC) address and so on according to the served service type, and the group identification information may be set by a network operation and maintenance administrator through a network management background.

In step 702, the load balancing module (LB) establishes a load balancing group table according to the load information collected by the data collection unit, the group table includes: a group identifier, group identification information, a group branch selection policy, address information (including IP address and MAC address information) of the group branch object, and weight information of the group branch, weight information of each branch may include one bearing space value. The bearing space value may be formed by a digital with one bit or a plurality of bits, and bearing space value of various branches within the group are arranged in an ascending order, for example, a certain group has n branches in total, wherein, a bearing space value of the ith branch is $L_i$, and it represents a space range of $_{Li-i}$ to $L_i$ a space range of the first branch means a space range of 0 to $L_1$.

The weight information of the embodiment of the present document may be reflected by means of bearing space, and may also use other ways such as a percentage format, in order to simplify the descriptions, means of the bearing space is selected and used in the following document in the embodiment of the present document;

an LB group table generation unit requests a network Controller to establish an LB group routing table, and information of the load balancing group table is carried in the request.

In step 703, the network Controller generates a load balancing group routing table according to the information of the load balancing group table after receiving the request;

according to the address information of the VNF in the load balancing group table and the current network topology information, the network controller searches a Switch associated with the VNF, and configures a load balancing group routing table for the switch, and the routing table format may be as shown in Table 1.

The load balancing group routing table may include: group identification information, a group branch selection policy, LB group table group identification information, and/or LB group table execution exit information. Wherein, the LB group identification information may include: an original target MAC address, an original target IP address, and/or an ingress port and so on, the information is mainly used for the switch to identify the group; the LB group execution egress information includes: a branch target IP address and target MAC address, a branch egress port and weight information, here the weight information is exampled by the bearing space, wherein, the branch target IP address and MAC address are mainly used for replacing the target IP address and target MAC address in the original packet with the branch target IP address and MAC address based on the requirement when the Switch selects a branch to forward the data packet according to the load balancing policy.

In the LB group routing table, each group may correspond to one or a plurality of pieces of group identification information, and meanwhile, the same group may correspond to more branch records.

TABLE 1

| Group identifier | Branch selection policy | LB group identification information | | | LB group execution egress information | | | |
|---|---|---|---|---|---|---|---|---|
| | | Original target MAC address | Original target IP address | Ingress port | Target MAC address | Target IP address | Egress port | Bearing space |
| G1 | 1 | 00-1c-52-7b-3b-37 | 10.70.25.34 | 112 | 00-1c-52-7b-3b-01 | 192.0.0.1 | 1 | 30 |
| | | | | | 00-1c-52-7b-3b-02 | 192.0.0.2 | 2 | 50 |
| | | | | | 00-1c-52-7b-3b-03 | 192.0.0.3 | 3 | 70 |
| | | | | | 00-1c-52-7b-3b-04 | 192.0.0.4 | 4 | 100 |
| G2 | 1 | 01-00-52-7b-3b-01 | 10.70.25.34 | 112 | 01-00-52-7b-3b-05 | 192.0.0.5 | 8 | 40 |
| | | | | | 01-00-52-7b-3b-06 | 192.0.0.6 | 7 | 60 |
| | | 01-00-52-7b-3b-02 | 10.70.25.35 | 111 | 01-00-52-7b-3b-07 | 192.0.0.7 | 6 | 80 |
| | | | | | 01-00-52-7b-3b-08 | 192.0.0.7 | 5 | 100 |
| ... | ... | ... | ... | ... | ... | ... | ... | ... |

The Controller sends the LB group routing table to a target Switch.

In step 704, a switch module stores the received LB group routing table, and feeds back an LB group routing table sending completion response to the Controller.

In step 705, the Controller feeds back to the LB that the establishment of LB group routing table is completed.

Figure 9:
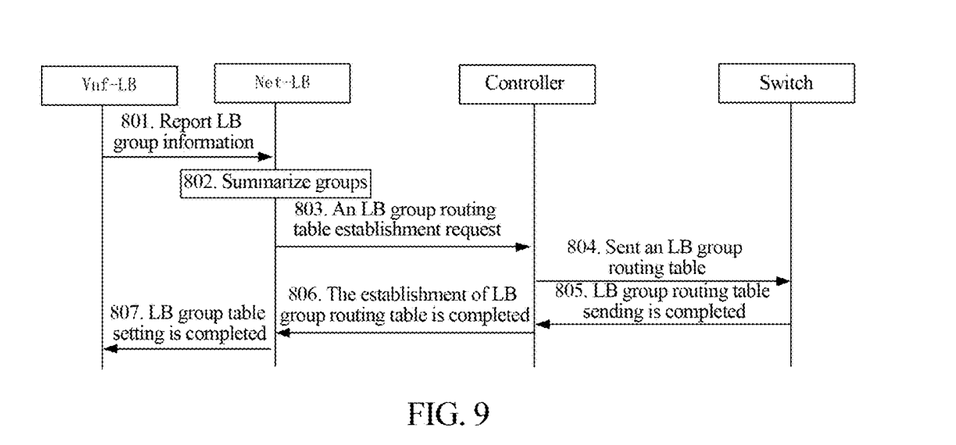
FIG. 9 is a flow chart of establishing a load balancing group routing table corresponding to the architecture model in FIG. 5 in the embodiment of the present document.

FIG. 9 is a flow chart of establishing a load balancing group routing table corresponding to the architecture model in FIG. 5, and the following steps are included:

In step 801, a network element level load balancing module (Vnf-LB) is responsible for collecting LB load information of each virtual machine within the VNF network elements, the included contents are as mentioned in the step 701, the Vnf-LB takes charge of generating an LB group table within the VNF network elements, and the information included in the table refers to the descriptions in the step 702;

the Vnf-LB reports the LB load information collected by the Vnf-LB itself to the Net-LB.

In step 802, the Net-LB receives and summarizes the information reported by its sub-level Vnf-LB, combines groups of the same type, and reallocates weights, for example, a relation of VNF1 and a VNF2 is a load sharing relationship, the Net-LB combines groups with same functions within the VNF1 and VNF2 to generate a larger group.

Step 803 to step 806 are similar to the step 702 to step 705.

In step 807, the Net-LB feeds back to the Vnf-LB that the LB group setting is successful.

Figure 10:
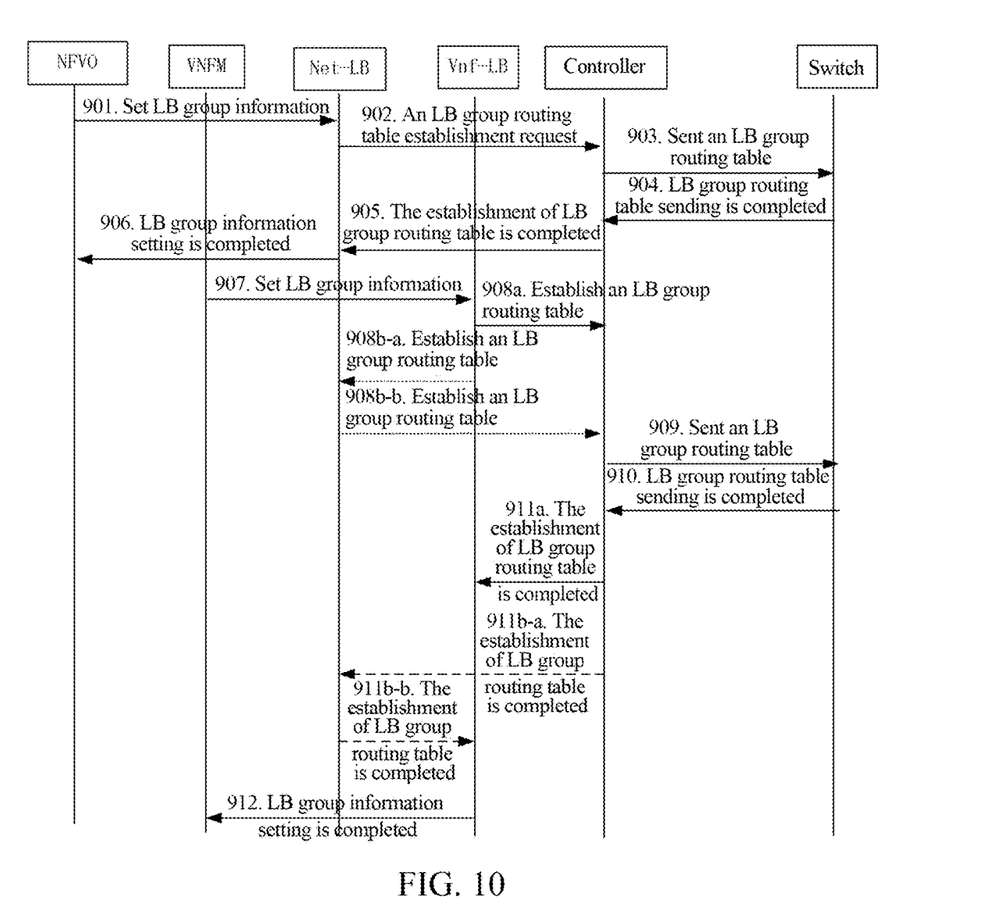
FIG. 10 is a flow chart of establishing a load balancing group routing table corresponding to the architecture model in FIG. 6 in the embodiment of the present document.

FIG. 10 is a flow chart of establishing a load balancing group routing table corresponding to the architecture model in FIG. 6 in the embodiment of the present document, and as shown in FIG. 10, the following steps are included:

In step 901, an NFVO sets load balancing load information between VNFs for an Net-LB, including groups of the VNFs, each piece of load information includes: VNF information, capability information supported by each VNF (such as the maximum number of supported examples and the maximum number of access sessions and so on) and address information externally presented by the VNF and so on;

Step 902 to step 905 are similar to the step 702 to step 705;

In step 906, the Net-LB feeds back LB setting completion information to the NFVO;

In step 907, a VNFM sets load balancing load information between various virtual machines VMs within the VNFs for the Vnf-LB, and the information includes: group information of the VMs, VM information included in each group, capability information supported by each VM and address information of each VM and so on;

In step 908a, the Vnf-Net may directly request a Controller to establish an LB group routing table; or In step 908b-a to step 908b-b, the Vnf-Net may request the Controller to establish an LB group routing table by the forwarding of the Net-LB;

Step 909 to step 910 are similar to the step 703 to step 704;

In step 911a, the Controller feeds back to the Vnf-LB that the establishment of an LB group routing table is completed; or In step 911b-a to step 911b-b, the Controller feeds back to the Net-LB that the establishment of an LB group routing table is completed, and then the Net-LB feeds back to the Vnf-LB that the establishment of the LB group routing table is completed;

In step 912, the Vnf-LB feeds back to the VNFM that an LB group information setting is completed.

Figure 11:
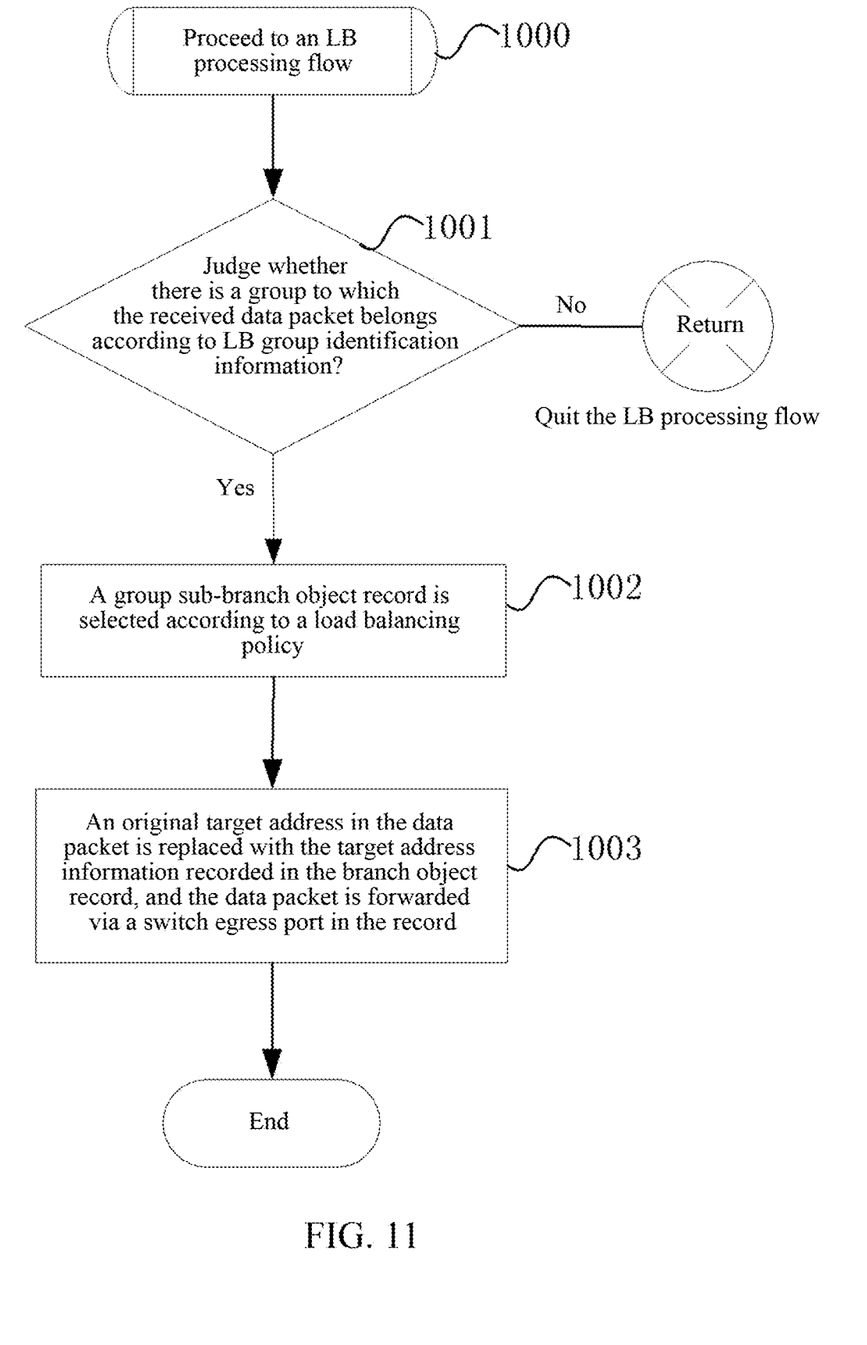
FIG. 11 is a flow chart of routing according to an LB group routing table in one embodiment of the present document.

FIG. 11 is a flow chart of routing according to an LB group routing table in the embodiment of the present document, the Switch here corresponds to the switch module in FIG. 4, and as shown in FIG. 11, the following steps are included:

In step 1000, the Switch triggers an LB flow after receiving a data packet;

In step 1001, the Switch receives the data packet, firstly judges a group to which the current data packet belongs according to group identification information in an LB group routing table, if the corresponding group is not found, returns to quit the LB processing flow;

the group identification information includes a key field required to be detected, if a judgment is made according to target address information or according to information including a target port and so on, the switch acquires a corresponding key field value in the data packet to match with the group identification information in the LB group routing table, thereby judging whether there is a belonged group.

In step 1002, the Switch selects a group sub-branch object record (i.e. the corresponding routing) from the LB group routing table according to a group load balancing policy, replaces an original target address in the data packet with the target address information recorded in the group sub-branch object record, and forwards the data packet via a switch egress port in the record.

Replacing target address information is alternative here, and target address information may be not replaced in a special scenario.

Figure 12:
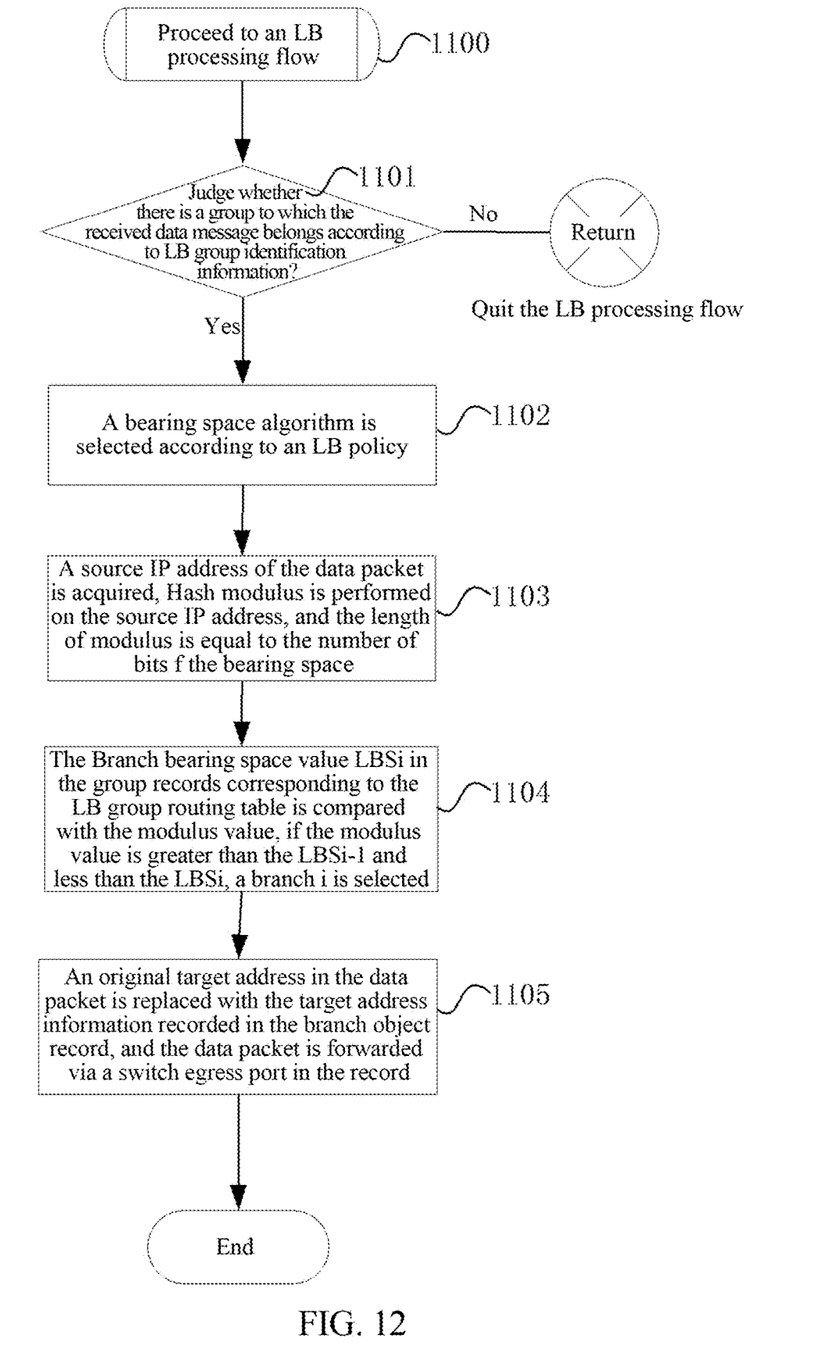
FIG. 12 is a flow chart of routing according to an LB group routing table in another embodiment of the present document.

FIG. 12 is a flow chart of routing according to an LB group routing table in another embodiment of the present document, the routing is determined based on a bearing space load balancing algorithm in the embodiment, with the algorithm which may be applied to the switch module, a plurality of messages of the same user are guaranteed to be forwarded via the same port. In the embodiment, the switch module receives the data packet, acquires an identifier that can identify the user in the data packet, and calculates a bearing space to which the data packet belongs according to the identifier, and the forwarding module selects a switch egress port of the group branch object according to the bearing space to forward the data packet.

Wherein, the identifier that can identify the user may consist of a source IP address, in the data packet, or a target IP address, or a data fragment at the packet load characteristic location.

Wherein, the bearing space is used for balancing a load proportion of each sub-branch object in the group, and it consists of a digital with one bit or a plurality of bits, the load proportion corresponding to the group branch object is equal to a bearing space value corresponding to the group branch object minus a bearing space value of the previous branch and then divided by a maximum branch bearing space value in the group. In the group, the bearing space values of the various branch objects are arranged according to an order from small to large, a load proportion of the first branch in the group is equal to a bearing space value corresponding to the first branch minus 0 and divided by a bearing space summation.

For example, a load balancing group has three branch objects, and the load proportions are 20%, 30% and 50% respectively, thus the bearing space values of the three branch objects are: 20, 50 and 100 respectively.

Wherein, determining the bearing space value to which the data packet belongs includes: Hash operation is performed on the user identifier, the Hash value at the end which has a same number of bits with a number of bits of the bearing space is taken, and is compared with each bearing space value in the corresponding group, and when a Hash end value of the user identifier is less than a bearing space value $LBS_i$ of an ith branch object and greater than a bearing space value $LBS_{i-1}$ of an i-1th branch object, it is to determine that the bearing space value to which the data packet belongs is the bearing space value of the ith branch object, wherein, when i=1, $LBS_0=0$.

As shown in FIG. 12, the following steps may be included:

Step 1100 to step 1101 are similar to the step 1000 to step 1001.

In step 1102, the Switch selects a group branch according to a bearing space algorithm;

In step 1103, the Switch acquires source IP address information in the data packet, and performs Hash modulus on the source IP address information, the length of modulus is equal to the length of the bearing space;

In step 1104, a branch bearing space value ($LBS_i$) in the corresponding group records in the LB group routing table is compared with the modulus value, if the modulus value is greater than the $LBS_{i-1}$ and less than the $LBS_i$, a branch i is selected, and when i=1, $LBS_0=0$.

In step 1105, an original target address in the data packet is replaced with the target address information recorded in the branch object record, and the data packet is forwarded via a switch egress port in the record. The target address information may include a target IP address and a target MAC address.

The ordinary person skilled in the art can understand that all or part of the steps in the above method can be completed by a program instructing related hardware, and the program can be stored in a computer readable memory medium, such as a read-only memory, magnetic disk or optical disk and so on. Alternatively, all or part of the steps of the above embodiments also can be implemented by using one or a plurality of integrated circuits. Correspondingly, each module/unit in the above embodiments can be implemented in a form of hardware, and also can be implemented in a form of software function module. The present document is not limited to any combination of hardware and software in a specific form.

The above description is only the preferred embodiments of the present document. Certainly, the present document can still have other various embodiments, the skilled people familiar to the art can make various corresponding changes and modifications according to the present document without departing from the rule and essence of the present document, and these corresponding changes and modifications shall all fall into the protection scope of the appended claims of the present document.

INDUSTRIAL APPLICABILITY

In a load balancing method and system provided in the embodiments of the present document, a concept of separating forwarding and control is introduced, the data flows are bypassed the LB, and the LB is responsible for collecting performance data of the VNF, and dynamically changes the data flow weight in the switch through a northbound interface of the network controller, which reduces the load of the LB, and avoids that the LB becomes a bottleneck of the network.

What is claimed is:

1. A load balancing method, comprising:
   collecting load information of a load balancing object, and generating a load balancing group table according to the load information;
   generating a load balancing group routing table according to information of the load balancing group table; and
   forwarding a data packet according to the load balancing group routing table,
   wherein information in the load balancing group routing table at least comprises:
   a group identifier, group identification information, branch object load weight information, and/or a sub-group object switch egress port,
   wherein, the branch object load weight information is represented by a bearing space value, branch objects in the load balancing group routing table are arranged according to an order of bearing space values from small to large, and a load proportion corresponding to each branch object is equal to a bearing space value corresponding to the branch object minus a bearing space value corresponding to a previous branch object and divided by a maximum branch bearing space value in a group having the group identifier.

2. The method according to claim 1, wherein the load information at least comprises:
processing capability information or load weight information of load balancing group branch objects;
the number of the load balancing group branch objects;
address information of the load balancing group branch objects;
the number of load balancing groups; and/or
group identification information of the load balancing groups.

3. The method according to claim 1, wherein, said collecting load information of a load balancing object comprises:
in a layered organization architecture model, respectively collecting load information of each load balancing group;
summarizing load information of all load balancing groups, and determining load weight information of each load balancing group.

4. The method according to claim 1, wherein, said collecting load information of a load balancing object comprises:
in a virtual network function architecture model, collecting load information between virtual network elements set by a network function virtualization orchestration; and
collecting load information between virtual machines within virtual network elements set by a virtual network element management.

5. The method according to claim 1, wherein, said forwarding a data packet according to the load balancing group routing table comprises:
acquiring a user identifier of the data packet;
determining a bearing space value to which the data packet belongs according to the user identifier; and
selecting a corresponding group sub-branch object from the load balancing routing table according to the bearing space value to forward the data packet.

6. The method according to claim 5, wherein, said determining a bearing space value to which the data packet belongs according to the user identifier comprises:
performing Hash operation on the user identifier, at a specified location taking a Hash value which has a same number of bits with that of the bearing space value, and comparing the Hash value with various bearing space values in a corresponding group, when the Hash value is less than a bearing space value of an ith branch object and greater than a bearing space value of an (i−1)th branch object, determining that the bearing space value to which the data packet belongs is a bearing space value of an ith branch object, wherein i is a positive integer, and when i=1, a bearing space value of a 0th branch object is 0.

7. A load balancing system, comprising hardware performing instructions stored in a non-transitory computer readable medium which implements the following elements:
a load balancing module configured to collect load information of a load balancing object, and generate a load balancing group table according to the load information;
a network controller configured to generate a load balancing group routing table according to information of the load balancing group table, and send the load balancing group routing table to the switch module; and
a network switch module configured to, forward a data packet according to the load balancing group routing table,
wherein, information in the load balancing group routing table generated by the network controller at least comprises:
a group identifier, group identification information, branch object load weight information, and a subgroup object switch egress port,
wherein, the branch object load weight information is represented by a bearing space value, branch objects in the load balancing group routing table are arranged according to an order of bearing space values from small to large, and a load proportion corresponding to each branch object is equal to a bearing space value corresponding to the branch object minus a bearing space value corresponding to a previous branch object and divided by a maximum branch bearing space value in a group having the group identifier.

8. The system according to claim 7, wherein, the load information collected by the load balancing module at least comprises:
processing capability information or load weight information of load balancing group branch objects;
the number of the load balancing group branch objects;
address information of the load balancing group branch objects;
the number of load balancing groups; and/or
group identification information of the load balancing groups.

9. The system according to claim 7, wherein, in a layered organization architecture model, the load balancing module comprises a plurality of first load balancing modules and a second load balancing module, wherein,
the first load balancing modules are respectively configured to collect load information of each load balancing group, and report collected load information to the second load balancing module;
the second load balancing module is configured to summarize load information of all load balancing groups, and determine load weight information of each load balancing group.

10. The system according to claim 7, wherein, in a virtual network function architecture model, the load balancing module comprises:
a first load balancing module, configured to collect load information between virtual network elements set by a network function virtualization Orchestration; and
a second load balancing module, configured to collect load information between various virtual machines within virtual network elements set by a virtual network element management.

11. The system according to claim 7, wherein:
the network switch module is configured to, acquire a user identifier of the data packet; determine a bearing space value to which the data packet belongs according to the user identifier; and select a corresponding group sub-branch object from the load balancing routing table according to the bearing space value to forward the data packet.

12. The system according to claim 11, wherein,
the network switch module is configured to determine a bearing space value to which the data packet belongs according to the user identifier as the following method: performing Hash operation on the user identifier, at a specified location taking a Hash value which has a same number of bits with that of the bearing space value, and comparing the Hash value with various bearing space values in a corresponding group, when the Hash value is less than a bearing space value of an ith branch object and greater than a bearing space value of an (i−1)th branch object, determining that the bearing space value to which the data packet belongs is a bearing space value of an ith branch object, wherein i is a positive integer, and when i=1, a bearing space value of a 0th branch object is 0.

13. A non-transitory computer-readable medium carrying a computer program, wherein when the computer program is executed by a load balancing system, the load balancing system executes a load balancing method, the method comprising:

collecting load information of a load balancing object, and generating a load balancing group table according to the load information;

generating a load balancing group routing table according to information of the load balancing group table; and forwarding a data packet according to the load balancing group routing table, wherein information in the load balancing group routing table at least comprises:

a group identifier, group identification information, branch object load weight information, and/or a subgroup object switch egress port, wherein, the branch object load weight information is represented by a bearing space value, branch objects in the load balancing group routing table are arranged according to an order of bearing space values from small to large, and a load proportion corresponding to each branch object is equal to a bearing space value corresponding to the branch object minus a bearing space value corresponding to a previous branch object and divided by a maximum branch bearing space value in a group having the group identifier.

* * * * *